US012335703B2

(12) United States Patent
Jin et al.

(10) Patent No.: US 12,335,703 B2
(45) Date of Patent: Jun. 17, 2025

(54) MULTIFUNCTIONAL SOUNDING DEVICE

(71) Applicant: AAC Microtech (Changzhou) Co., Ltd., Jiangsu (CN)

(72) Inventors: Xin Jin, Changzhou (CN); Fan Zhang, Changzhou (CN); Wei Song, Changzhou (CN); Ronglin Linghu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 246 days.

(21) Appl. No.: 18/341,747

(22) Filed: Jun. 26, 2023

(65) Prior Publication Data

US 2024/0147157 A1 May 2, 2024

Related U.S. Application Data

(63) Continuation of application No. PCT/CN2022/134574, filed on Nov. 28, 2022.

(30) Foreign Application Priority Data

Oct. 28, 2022 (CN) ........................ 202222871605.0

(51) Int. Cl.
*H04R 25/00* (2006.01)
*H04R 7/06* (2006.01)
*H04R 9/06* (2006.01)

(52) U.S. Cl.
CPC ................. *H04R 7/06* (2013.01); *H04R 9/06* (2013.01); *H04R 2499/11* (2013.01)

(58) Field of Classification Search
CPC .......................... H04R 11/02; H04R 2400/03; H04R 2400/11; H04R 2499/11; H04R 7/04; H04R 7/06; H04R 9/02; H04R 9/025; H04R 9/06
USPC .......................................................... 381/396
See application file for complete search history.

(56) References Cited

U.S. PATENT DOCUMENTS

2024/0089662 A1* 3/2024 Tang ...................... H04R 9/025
2024/0147157 A1* 5/2024 Jin ......................... H04R 9/025
2024/0186876 A1* 6/2024 Zhu ........................ H02K 33/16

* cited by examiner

*Primary Examiner* — Phylesha Dabney
(74) *Attorney, Agent, or Firm* — Wiersch Law Group

(57) ABSTRACT

The present disclosure provides a multifunctional sounding device, which includes a lower housing, an upper housing and a sounding unit. The sounding unit includes a frame, a vibration system and a magnetic circuit system. The magnetic circuit system includes a main magnetic circuit, a first auxiliary magnetic circuit and a second auxiliary magnetic circuit. The first auxiliary magnetic circuit includes a first auxiliary magnet and a first auxiliary pole plate. The multifunctional sounding device also includes a motor assembly having a vibration unit and an elastic member. The main magnetic circuit, the first auxiliary magnetic circuit and the second auxiliary magnetic circuit are respectively fixed in the lower housing or the upper housing. This is not only beneficial to control the magnetic gap, but also improves production accuracy and product consistency.

10 Claims, 3 Drawing Sheets

A-A

MULTIFUNCTIONAL SOUNDING DEVICE

TECHNICAL FIELD

The present disclosure relates to the field of electroacoustic transducers, especially to a multifunctional sounding device.

BACKGROUND ART

With the continuous innovation of smart mobile devices, they are more and more popular among users. The most common ones are mobile phones, tablets, and handheld game consoles. Music playback and vibration functions have become the basis for smart mobile devices. Function. The multifunctional sounding device with music playing function and vibration function has been widely applied to smart mobile devices.

The multifunctional sounding device of the related art includes a housing body, a sounding unit accommodated in the housing body and a motor assembly for generating vibration, wherein the sounding unit includes a frame, a vibration system, and a magnetic circuit system with a magnetic gap. The motor assembly mainly includes a vibration unit and an elastic member that elastically suspends the vibration unit on the housing body, and the vibration unit mainly includes a driving coil.

In order to provide enough driving force for the driving coil and maintain the magnetic gap space of the magnetic circuit system, it is necessary to fix the entire magnetic circuit system in the housing body. Meanwhile, the multifunctional sounding device of the prior art, there is no fixed method that can provide driving force for the driving coil and facilitate the control of the magnetic circuit system of the magnetic gap.

Therefore, it is necessary to provide a new the multifunctional sounding device to solve the above technical problems.

SUMMARY OF THE INVENTION

On of the purposes of the present disclosure is to provide a multifunctional sounding device to solve the problem that the existing multifunctional sounding device does not have a fixed way to provide the driving force for the driving coil and facilitate the control of the magnetic circuit system of the magnetic gap.

In order to achieve the above-mentioned object, the present disclosure provides a multifunctional sounding device, including: a lower housing; an upper housing engaging with the lower housing for forming a containment space; a sound outlet penetrating the upper housing; a sounding unit accommodated in the containment space, including a frame, a vibration system fixed to the frame, and a magnetic circuit system having a magnetic gap for driving the vibration system to vibrate; and a motor assembly accommodated in the containment space. The motor assembly includes a vibration unit arranged on a side of the magnetic circuit system away from the vibration system, and an elastic member elastically suspending the vibration unit in the containment space.

The magnetic circuit system includes a main magnetic circuit fixed to the lower housing, a first auxiliary magnetic circuit and a second auxiliary magnetic circuit respectively surrounding the main magnetic circuit for forming the magnetic gap. The vibration unit includes a driving coil fixedly connected to the second auxiliary magnetic circuit; and the first auxiliary magnetic circuit includes a first auxiliary magnet, a first auxiliary pole plate fixed to the first auxiliary magnet for fixing the first auxiliary magnet to the lower housing.

In addition, the first auxiliary pole plate includes a stacked part fixed on a side of the first auxiliary magnet close to the vibration system, and an extension part formed by bending and extending a side of the stacked part away from the main magnet towards the direction of the lower housing; the extension part extends to a side of the lower housing opposite to the sound outlet; the extension part is spaced apart from the corresponding first auxiliary magnet.

In addition, the extension part is a multi-layered ladder structure extending obliquely downward and the ladder farthest from the stacked part is fixed to the lower housing.

In addition, the first auxiliary pole plate further includes a wrapped part formed by bending and extending opposite sides of the stacked part close to the two second auxiliary magnets in a direction away from the vibration system; the wrapped part is spaced apart from the first auxiliary magnet, and a side close to the extension part is fixedly connected to the extension part.

In addition, the magnetic circuit system is rectangular; the main magnetic circuit includes a lower plate fixed to the lower housing, a main magnet fixed on the side of the lower plate close to the vibration system, and a main pole plate stacked and fixed on the side of the main magnet close to the vibration system; the first auxiliary magnet includes two and are respectively positioned on opposite sides of the short axis of the main magnet; the first auxiliary pole plate also includes two, and one of the first auxiliary pole plates is stacked and fixed on one of the first auxiliary magnets; the second auxiliary magnetic circuit includes two of second auxiliary magnets respectively positioned on opposite sides of the long axis of the main magnet, and two of second auxiliary pole plates respectively stacked on the side of the two second auxiliary magnets close to the vibration system.

In addition, an amount of the driving coil is two, and the two driving coils are respectively arranged on opposite sides of the lower plate along a vibration direction of the vibration unit.

In addition, the vibration unit further includes a weight; the elastic members are respectively fixed on opposite sides of the weight along a vibration direction of the vibration unit; the weight is arranged with an installation hole penetrating therethrough; the lower plate passes through the installation hole and is fixed on the side of the lower housing opposite to the sound outlet; both the second auxiliary magnet and the driving coil are fixedly connected to the weight.

In addition, an amount of the elastic member is two; the two elastic members are arranged symmetrically to a center and are respectively positioned on opposite sides of the weight along the vibration direction of the vibration unit; one end of the elastic member is fixed to a peripheral side of the lower housing or the upper housing, and the other end is fixed to the peripheral side of the weight; each of the elastic member is in a U-shape.

In addition, the motor assembly further includes a flexible conductive connector electrically connected to the driving coil; the flexible conductive connector includes a fixed part fixed on the side of the weight away from the vibration system, an elastic arm formed by bending and extending one side of the fixed part, a penetrated part extending from the elastic arm to the containment space and passing through the lower housing and/or the upper housing.

In addition, the vibration system includes a diaphragm fixed to the frame and a voice coil inserted into and suspended in the magnetic gap and driving the diaphragm to vibrate; a side of the diaphragm away from the frame is fixed to the upper housing and opposite to the sound outlet.

Compared with related technologies, in the multifunctional sounding device of the present disclosure, the main magnetic circuit is fixed to the lower housing, the first auxiliary magnet of the first auxiliary magnetic circuit is fixed to the lower housing by stacking the first auxiliary pole plate fixed on it, the second auxiliary magnetic circuit is fixedly connected with the driving coil, Thus, the main magnetic circuit, the first auxiliary magnetic circuit and the second auxiliary magnetic circuit are respectively fixed in the lower housing or the upper housing. This is not only beneficial to control the magnetic gap, but also improves production accuracy and product consistency.

DETAILED DESCRIPTION OF EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
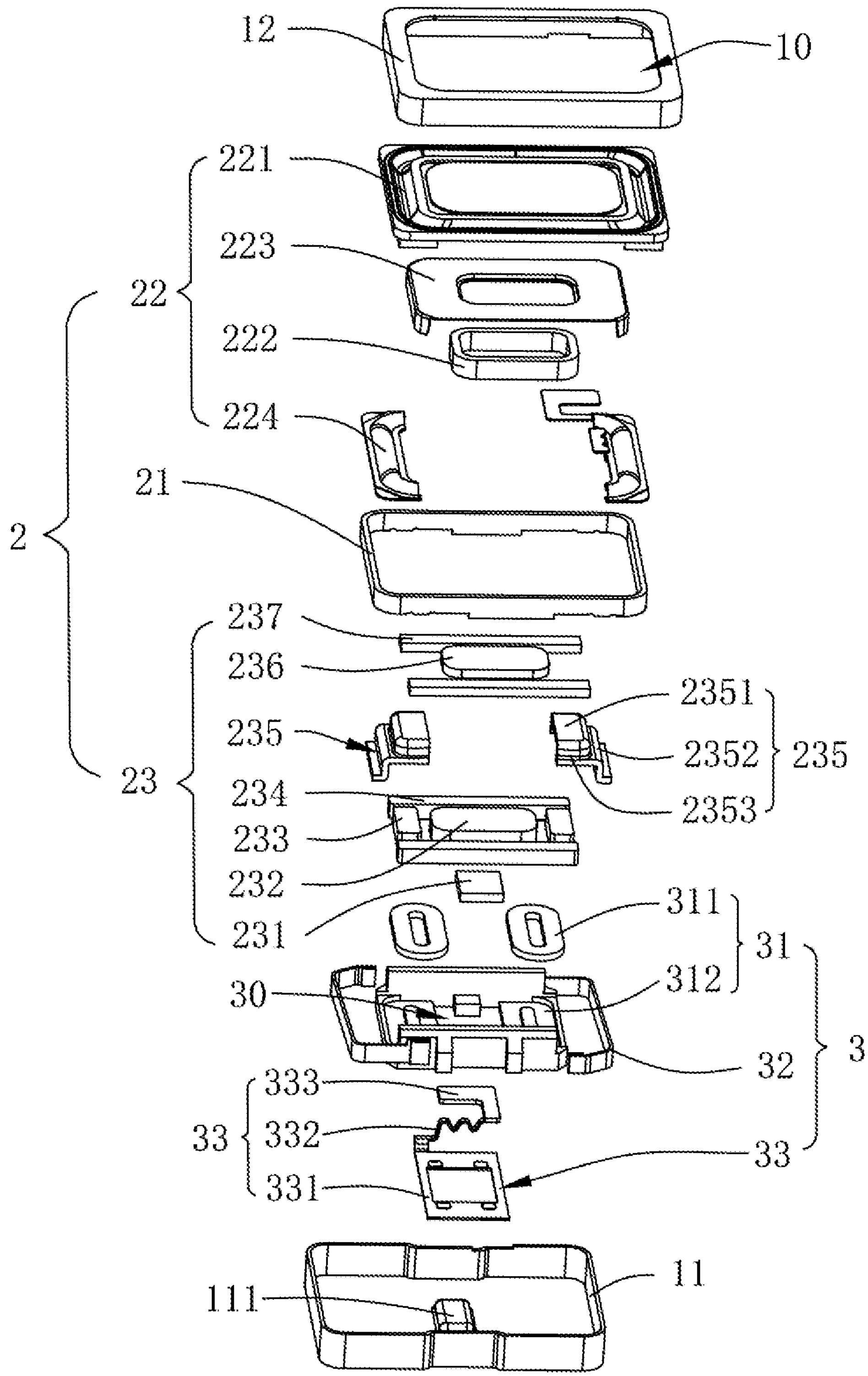
FIG. 1 is an exploded view of a multifunctional sounding device in accordance with an embodiment of the present disclosure.
Figure 2:
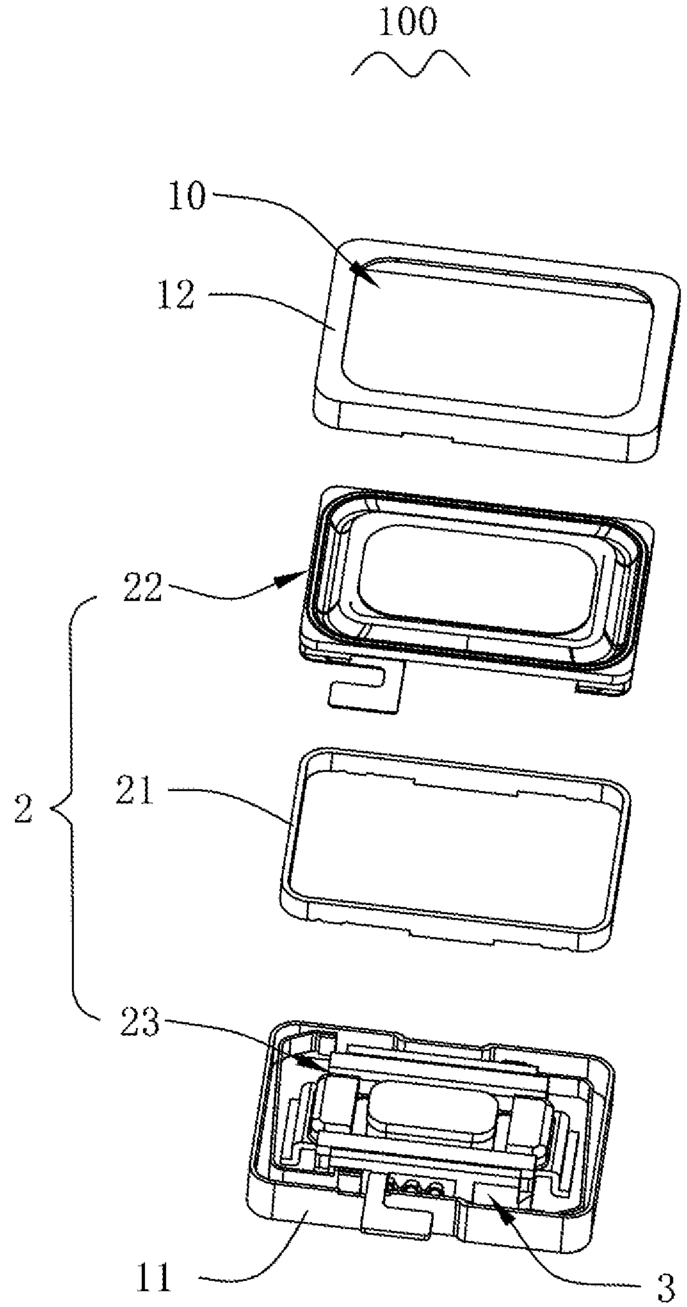
FIG. 2 is a partially exploded view of the multifunctional sounding device in FIG. 1.
Figure 3:
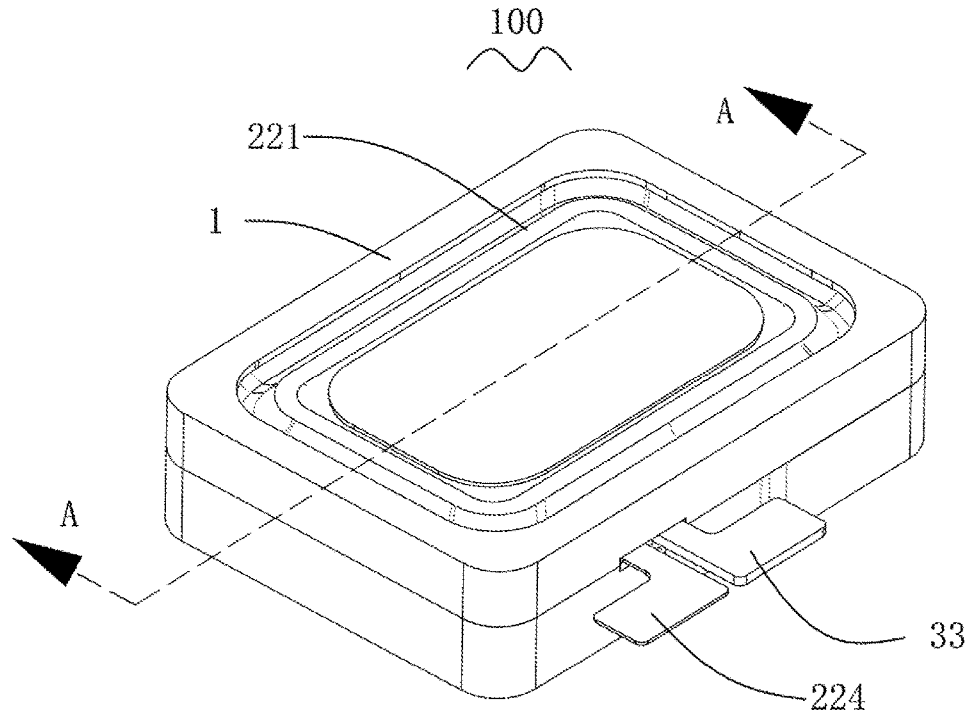
FIG. 3 is an isometric view of the multifunctional sounding device of the present disclosure.
Figure 4:
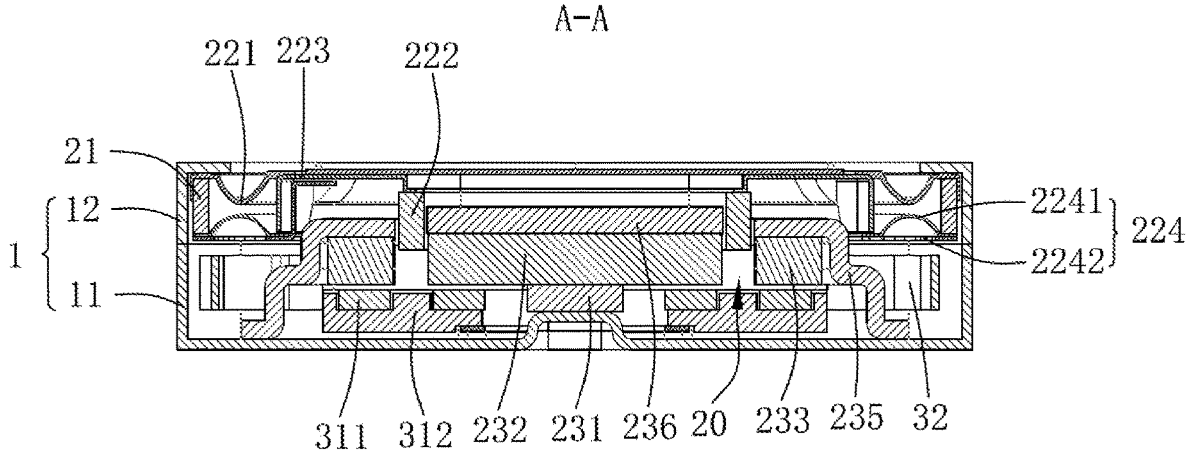
FIG. 4 is a cross-sectional view of the multifunctional sounding device taken along line AA in FIG. 3.

As shown in FIGS. 1-4, an embodiment of the present disclosure provides a multifunctional sounding device 100, which includes a lower housing 11, an upper housing that is built on the lower housing 11 and jointly forms the containment space 12, a sounding unit 2 accommodated in the containment space, and a motor assembly 3. The upper housing 12 is provided with a sound outlet 10 penetrating therethrough.

The lower housing 11 and the upper housing 12 jointly form the housing body 1 of the multifunctional sounding device 100.

Specifically, the sounding unit 2 includes a frame 21, a vibration system 22 fixed to the frame 21, and a magnetic circuit system 23 having the magnetic gap 20 and driving the vibration system 22 to vibrate and produce sound.

Specifically, the vibration system 22 includes a diaphragm 221 fixed on the frame 21 and a voice coil 222 inserted into and suspended in the magnetic gap 20 to drive the diaphragm 221 to vibrate. The side of the diaphragm 221 away from the frame 21 is fixed to the upper housing 12 and is arranged opposite to the sound outlet 10.

Specifically, the magnetic circuit system 23 includes a main magnetic circuit fixed to the lower housing 11, and a first auxiliary magnetic circuit and a second auxiliary magnetic respectively surrounding the main magnetic circuit and forming the magnetic gap 20 with space with the main magnetic circuit. The main magnetic circuit is fixed to the lower housing 11. The first auxiliary magnetic circuit includes a first auxiliary magnet 233 and a first auxiliary pole plate 235 stacked and fixed on the first auxiliary magnet 233. The first auxiliary pole plate 235 fixes the first auxiliary magnet 233 to the lower housing 11. In this way, the magnetic field of the magnetic circuit system 23 can be increased through the first auxiliary pole plate 235, and the first auxiliary magnet 233 can be fixed to the lower housing 11 through the first auxiliary pole plate 235.

Wherein, the first auxiliary pole plate 235 fixes the first auxiliary magnet 233 on the side of the lower housing 11 opposite to the sound outlet 10, equivalently, the first auxiliary pole plate 235 fixes the first auxiliary magnet 233 to the bottom or bottom surface of the lower housing 11.

The magnetic circuit system is a rectangular in shape. The main magnetic circuit includes a lower plate 231 fixed on the lower housing 11, a main magnet 232 fixed on the side of the lower plate 231 close to the vibration system 22, and a main pole plate 236 fixed on the side of the main magnet 232 close to the vibration system 22. The first auxiliary magnet 233 includes two and are respectively positioned on opposite sides of the short axis of the main magnet 232, the first auxiliary pole plate 235 also includes two and one of the first auxiliary pole plate 235 is stacked and fixed on one of the first auxiliary magnet 233. The second auxiliary magnetic circuit includes two of second auxiliary magnets 234 positioned on opposite sides of the long axis of the main magnet 232, and two of second auxiliary pole plates 237 respectively stacked on the sides of the two second auxiliary magnets 234 close to the vibration system 22.

Specifically, the motor assembly 3 includes a vibration unit 31 arranged on the side of the magnetic circuit system 23 away from the diaphragm 221 and an elastic member 32 elastically suspending the vibration unit 31 in the containment space. The vibration unit 31 includes a driving coil 311 fixedly connected to the second auxiliary magnet 234 in the second auxiliary magnetic circuit.

Wherein, the vibration principle of the motor assembly 3 is: The driving coil 311 is positioned within the magnetic field of the main magnet 232 and the first auxiliary magnet 233 fixed to the housing body 1, and interacts to generate an electromagnetic field. At this time, the mutual driving force with the main magnet 232 and the first auxiliary magnet 233 can be realized by controlling the current direction of the driving coil 311. The main magnet 232 and the first auxiliary magnet 233 are fixed on the housing body 1 and cannot move, serve as the stator, and the driving coil 311 is suspended in the containment space through the elastic member 32 and can move, serve as the mover. In this way, the main magnet 232 and the first auxiliary magnet 233 can make the driving coil 311 vibrate, thereby driving the whole vibration unit 31 to vibrate.

The second auxiliary magnetic circuit is part of the mover in the motor assembly 3, namely the second auxiliary magnet 234 and the second auxiliary pole plate 237 are part of the mover of the motor.

In this embodiment, the lower housing 11 is provided with a protrusion part 111 protruding toward the direction close to the magnetic circuit system 23, and the lower plate 231 is fixed to the protrusion part 111.

In this embodiment, the vibration system 22 also includes a skeleton 223 fixed to the diaphragm 221 and an elastic support assembly 224 spaced apart from the diaphragm 221, the voice coil 222 is suspended in the magnetic gap 20 through the skeleton 223. The elastic support assembly 224 includes two and are respectively fixed on the opposite sides of the frame 21, and the other ends of the two elastic support assemblies 224 are respectively fixed on the opposite sides of the skeleton 223. On the one hand, the elastic support assembly 224 is used to strengthen the vibration effect of the diaphragm 221 and improve the acoustic performance of the multifunctional sounding device 100, on the other hand, it is used to balance the swing of the vibration system 22 and improve the stability of the multifunctional sounding device 100.

In this embodiment, the elastic support assembly 224 includes a auxiliary diaphragm 2241 fixed to the skeleton 223 and a circuit board 2242 fixed to the auxiliary diaphragm 2241. The circuit board 2242 is FPC (flexible circuit board). One of the circuit boards 2242 is exposed by passing through the lower housing 11 and/or the upper housing 12. It is used to introduce electrical signals to the voice coil 222, that is, the voice coil 222 can be electrically connected to the external circuit through the circuit board 2242 to realize independent control of the sounding unit 2.

In this embodiment, the first auxiliary pole plate 235 includes a stacked part 2351 fixed on one side of the first auxiliary magnet 233 near the diaphragm 221 in the vibration system 22, and an extension part 2352 formed by bending and extending the side of the stacked part 2351 away from the main magnet 232 towards the lower housing 11. The extension part 2352 extends to the side of the lower housing 11 opposite to the sound outlet and is fixedly connected thereto.

The extension part 2352 is spaced apart from the corresponding first auxiliary magnet 233; the extension part 2352 is a multi-layered ladder structure extending obliquely downward and the ladder farthest from the stacked part 2351 is fixed to the lower housing 11. This can not only prevent the extension of the first auxiliary pole plate 235 from being too close to the vibration unit 31, which may cause the vibration unit 31 to collide with it when it vibrates, but also improve the strength of the extension part 2352, so that it supports the first auxiliary magnet 233 more stably.

The first auxiliary pole plate 235 also includes a wrapped part 2352 formed by bending and extending the stacked part 2351 on opposite sides of the two second auxiliary magnets 234 along the direction away from the diaphragm 221 in the vibration system 22 respectively. The wrapped part 2352 is spaced apart from the first auxiliary magnet 233 and the side close to the extension part 2352 is fixedly connected to the extension part 2352. The first auxiliary pole plate 235 can better cover the first auxiliary magnet 233 to increase the magnetic field of the magnetic circuit system 23.

In this embodiment, the driving coil 311 includes two and are respectively arranged on opposite sides of the lower plate 231 along the vibration direction of the vibration unit 31.

In this embodiment, the vibration unit 31 also includes a weight 312. The elastic member 32 is respectively fixed on opposite sides of the weight 312 along the vibration direction of the vibration unit 31. The weight 312 is arranged with an installation hole 30 penetrating therethrough. The lower plate 231 passes through the installation hole 30 and is fixed on the side of the lower housing 11 opposite to the sound outlet 10, and the second auxiliary magnet 234 and the driving coil 311 are fixed on the weight 312. In this way, the weight 312 can be used to counterweight the vibration unit 31 to provide the vibration amplitude of the vibration unit 31, thereby improving the vibration effect of the device.

In addition, based on the arrangement of the main magnet 232, the first auxiliary magnet 233 and the second auxiliary magnet 234 in the magnetic circuit system 23, the weight can be designed to be smaller under the same vibration effect, so that more space can be used as the back cavity of the sounding unit 2 during vibration sounding, thereby improving the low-frequency acoustic performance.

In this embodiment, the motor assembly 3 further includes a flexible conductive connector 33 electrically connected to the driving coil 311. The flexible conductive connector 33 includes a fixed part 331 fixed on the side of the weight 312 away from the diaphragm 221 in the vibration system 22, an elastic arm 332 formed by bending and extending one side of the fixed part 331, and a penetrated part 333 extending from the elastic arm 332 to outer side of the containment space and passing through the lower housing 11 and/or the upper housing 12. The flexible conductive connector 33 is FPC (the flexible circuit board), which introduces electrical signals to the driving coil 311, so as to realize the independent control of the motor assembly 3.

In this embodiment, the elastic member 32 includes two and both are U-shaped structures, and the two elastic members 32 are arranged symmetrically to the center and are respectively positioned on opposite sides of the weight 312 along the vibration direction of the vibration unit 31. One end of the elastic member 32 is fixed to the peripheral side of the lower housing 11 or the upper housing 12, and the other end is fixed to the peripheral side of the weight 312. The weight 312 can be elastically suspended in the containment space more stably.

The multifunctional sounding device 100 of this embodiment, the main magnetic circuit is fixed on the lower housing 11. The first auxiliary magnet 233 of the first auxiliary magnetic circuit is fixed to the lower housing by the first auxiliary pole plate 235 stacked and fixed thereon. The second auxiliary magnetic circuit is fixed with the driving coil 311. In this way, the main magnetic circuit, the first auxiliary magnetic circuit and the second auxiliary magnetic circuit are respectively fixed on the lower housing 11 or the upper housing 12, which is beneficial to control the magnetic gap 20, while improving production accuracy and product quality consistency. In addition, the second auxiliary magnetic circuit is used as the movable mover of the motor, that is, as a part of the vibration unit 31, so that the counterweight of the weight 312 can be reduced, and part of the volume of the weight 312 can be released. In the housing body 1 with the same external volume, the volume released by the weight 312 can be converted into the volume of the back cavity of the loudspeaker (the sounding part), which is beneficial to improve the performance of the loudspeaker. In addition, the counterweight of the weight 312 is reduced, which is beneficial to save the material cost of the weight 312.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device, including:

a lower housing;

an upper housing engaging with the lower housing for forming a containment space;

a sound outlet penetrating the upper housing;

a sounding unit accommodated in the containment space, including a frame, a vibration system fixed to the frame, and a magnetic circuit system having a magnetic gap for driving the vibration system to vibrate;

a motor assembly accommodated in the containment space, including a vibration unit arranged on a side of the magnetic circuit system away from the vibration system, and an elastic member elastically suspending the vibration unit in the containment space; wherein the magnetic circuit system includes a main magnetic circuit fixed to the lower housing, a first auxiliary magnetic circuit and a second auxiliary magnetic circuit respectively surrounding the main magnetic circuit for forming the magnetic gap;

the vibration unit including a driving coil fixedly connected to the second auxiliary magnetic circuit; and the first auxiliary magnetic circuit includes a first auxiliary magnet, a first auxiliary pole plate fixed to the first auxiliary magnet for fixing the first auxiliary magnet to the lower housing.

2. The multifunctional sounding device as described in claim 1, wherein, the first auxiliary pole plate includes a stacked part fixed on a side of the first auxiliary magnet close to the vibration system, and an extension part formed by bending and extending a side of the stacked part away from the main magnet towards the direction of the lower housing; the extension part extends to a side of the lower housing opposite to the sound outlet; the extension part is spaced apart from the corresponding first auxiliary magnet.

3. The multifunctional sounding device as described in claim 2, wherein the extension part is a multi-layered ladder structure extending obliquely downward and the ladder farthest from the stacked part is fixed to the lower housing.

4. The multifunctional sounding device as described in claim 3, wherein, the first auxiliary pole plate further includes a wrapped part formed by bending and extending opposite sides of the stacked part close to the two second auxiliary magnets in a direction away from the vibration system; the wrapped part is spaced apart from the first auxiliary magnet, and a side close to the extension part is fixedly connected to the extension part.

5. The multifunctional sounding device as described in claim 1, wherein, the magnetic circuit system is rectangular; the main magnetic circuit includes a lower plate fixed to the lower housing, a main magnet fixed on the side of the lower plate close to the vibration system, and a main pole plate stacked and fixed on the side of the main magnet close to the vibration system; the first auxiliary magnet includes two and are respectively positioned on opposite sides of the short axis of the main magnet; the first auxiliary pole plate also includes two, and one of the first auxiliary pole plates is stacked and fixed on one of the first auxiliary magnets; the second auxiliary magnetic circuit includes two of second auxiliary magnets respectively positioned on opposite sides of the long axis of the main magnet, and two of second auxiliary pole plates respectively stacked on the side of the two second auxiliary magnets close to the vibration system.

6. The multifunctional sounding device as described in claim 5, wherein, an amount of the driving coil is two, and the two driving coils are respectively arranged on opposite sides of the lower plate along a vibration direction of the vibration unit.

7. The multifunctional sounding device as described in claim 5, wherein, the vibration unit further includes a weight; the elastic members are respectively fixed on opposite sides of the weight along a vibration direction of the vibration unit; the weight is arranged with an installation hole penetrating therethrough; the lower plate passes through the installation hole and is fixed on the side of the lower housing opposite to the sound outlet; both the second auxiliary magnet and the driving coil are fixedly connected to the weight.

8. The multifunctional sounding device as described in claim 7, wherein, an amount of the elastic member is two; the two elastic members are arranged symmetrically to a center and are respectively positioned on opposite sides of the weight along the vibration direction of the vibration unit; one end of the elastic member is fixed to a peripheral side of the lower housing or the upper housing, and the other end is fixed to the peripheral side of the weight; each of the elastic member is in a U-shape.

9. The multifunctional sounding device as described in claim 7, wherein, the motor assembly further includes a flexible conductive connector electrically connected to the driving coil; the flexible conductive connector includes a fixed part fixed on the side of the weight away from the vibration system, an elastic arm formed by bending and extending one side of the fixed part, a penetrated part extending from the elastic arm to the containment space and passing through the lower housing and/or the upper housing.

10. The multifunctional sounding device as described in claim 1, wherein, the vibration system includes a diaphragm fixed to the frame and a voice coil inserted into and suspended in the magnetic gap and driving the diaphragm to vibrate; a side of the diaphragm away from the frame is fixed to the upper housing and opposite to the sound outlet.

* * * * *